UNITED STATES PATENT OFFICE.

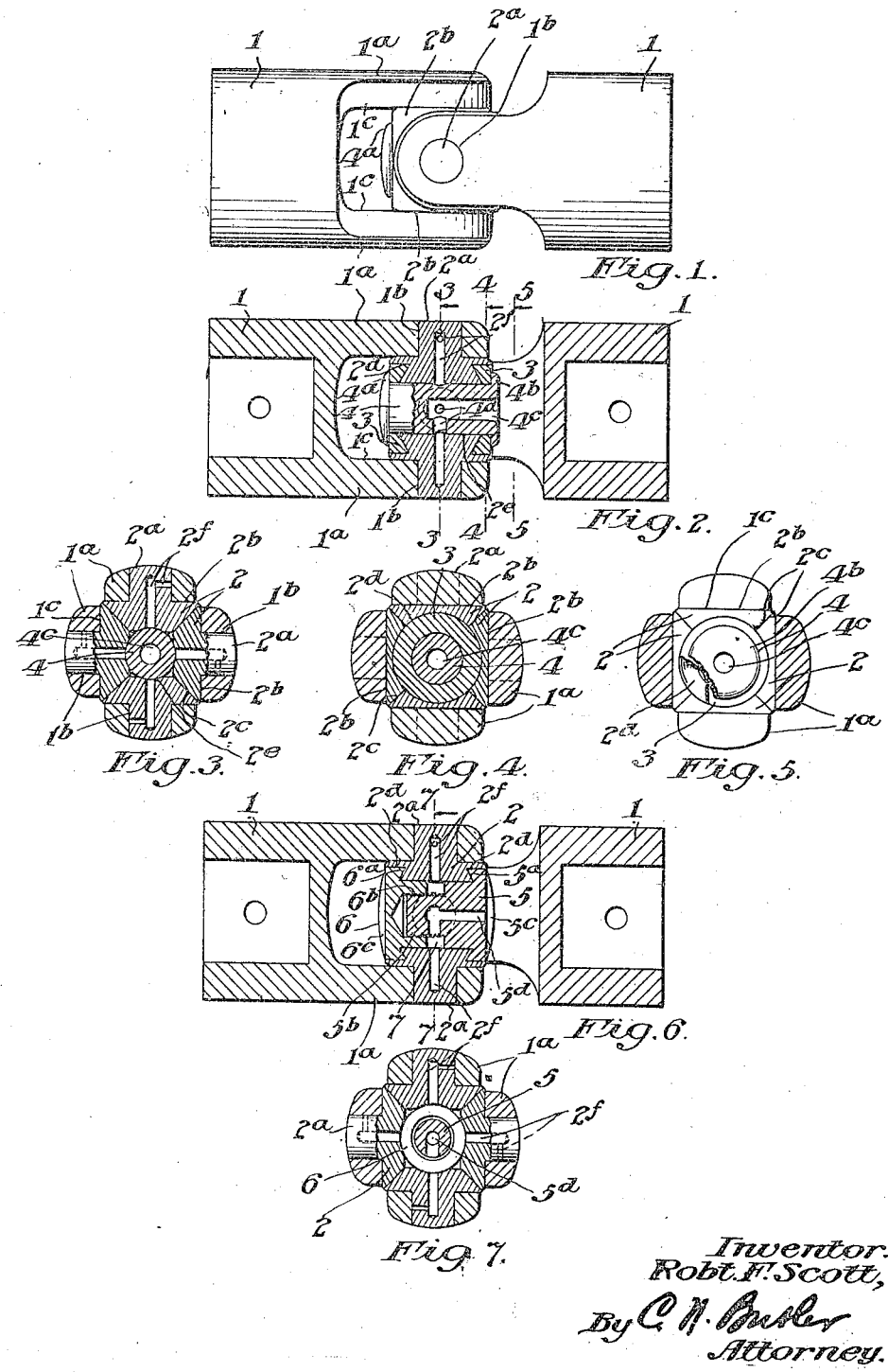

ROBERT F. SCOTT, OF PHILADELPHIA, PENNSYLVANIA, ASSIGNOR TO EDWIN HARRINGTON, SON & CO., INC., OF PHILADELPHIA, PENNSYLVANIA, A CORPORATION OF PENNSYLVANIA.

UNIVERSAL JOINT.

1,195,405. Specification of Letters Patent. Patented Aug. 22, 1916.

Application filed January 20, 1916. Serial No. 73,146.

*To all whom it may concern:*

Be it known that I, ROBERT F. SCOTT, a citizen of the United States, residing in the city of Philadelphia, county of Philadelphia, and State of Pennsylvania, have invented an Improved Universal Joint, of which the following is a specification.

This invention is designed to provide a universal joint of simple and efficient character, which can be manufactured, assembled and lubricated with facility.

In its preferred form, my improvements are embodied in a pair of yokes provided with transverse bearings, a segmental body provided with trunnions disposed in said bearings, means for clamping the segments of the body together, and means for oiling the frictional surfaces.

The nature and advantages of my improvements will be fully understood from the following description and the accompanying drawings in illustration thereof.

In the drawings, Figure 1 is a side elevation of a universal joint embodying my invention; Fig. 2 is a longitudinal sectional view of the same; Fig. 3 is a sectional view taken on the line 3—3 of Fig. 2; Fig. 4 is a sectional view taken on the line 4—4 of Fig. 2; Fig. 5 is an irregular sectional view taken on the line 5—5 of Fig. 2, and showing a part broken away for better illustration; Fig. 6 is a longitudinal sectional view of a joint embodying a modified form of the invention; and Fig. 7 is a sectional view taken on the line 7—7 of Fig. 6.

In the form of the invention illustrated in Figs. 1 to 5 inclusive, the yokes or bifurcated knuckles 1 have in the furcations 1ª thereof the journal bearings 1ᵇ.

Body segments 2 of like character are provided with trunnions or pintles 2ª journaled in the bearings 1ᵇ, faces 2ᵇ which bear against the inner faces 1ᶜ of the yoke, converging plane surfaces 2ᶜ upon which adjacent segments engage, channels 2ᵈ which register to form continuous circular channels extending transversely to the converging segment surfaces which engage in planes passing through the axis of the channels, curved segmental surfaces 2ᵉ which provide cylindrical bearings whose surfaces curve transversely to the joints between the segments, oil ducts 2ᶠ for lubricating the journals, rings 3 which fit in the segmental channels 2ᵈ, and a rivet 4 extending axially through the body formed by the segments in contact with the surfaces 2ᵉ, the rivet being provided with the flanges 4ª and 4ᵇ for pressing the rings to bind the body segments together and with the passages 4ᶜ and 4ᵈ for carrying a lubricant to the ducts 2ᶠ which deliver to the bearings.

The segments with the trunnions thereon are alike in construction so that they can be used interchangeably, assembled readily and made with facility, being of such character that they can be drawn together in a firm body by the pressure of the rivet on the rings, whose inclined surfaces draw through the similarly inclined surfaces of the segments or segment channels.

In the form of the invention illustrated in Figs. 6 and 7, the yokes 1 are combined through their furcations 1ª and the trunnions 2ª with the body segments 2 of the character and construction described, but the segments are here fixed together by two engaging studs 5 and 6 provided with the wedge shaped flanges 5ª and 6ª which are engaged in the conforming channels 2ᵈ of the body. The stud 5 is provided with a male screw 5ᵇ which engages the female screw 6ᵇ of the stud 6, the studs being provided with the respective slots 5ᶜ and 6ᶜ for the engagement of a tool to draw them up. The stud 5 contains an oil duct 5ᵈ which communicates with a channel 7 by which lubricant is carried to the ducts 2ᶠ. It will be understood that in this second form of the construction the parts of the body can be clamped together firmly on their planes of juncture axial to the studs by drawing up the latter.

Having described my invention, I claim:

1. In a universal joint, a body consisting wholly of segments joined on inclined surfaces, said segments having trunnions fixed thereto, and means for clamping said segments together.

2. In a universal joint, a body comprising segments joined on inclined surfaces, said segments having inclined surfaces transverse to said surfaces first named, and means engaging said inclined surfaces second named to clamp said segments together on said inclined surfaces first named, in combination with forks and means for connecting said forks in movable relation with said body.

3. In a universal joint, a pair of yokes having bearings in the furcations thereof, a body comprising segments provided with pintles journaled in said bearings, and means for clamping said segments together.

4. In a universal joint, a pair of yokes having bearings in the furcations thereof, a body comprising channeled segments having inclined engaging surfaces, rings engaging the channels of said segments to bind them together, and means for holding said rings.

5. In a universal joint, a pair of yokes, a body comprising channeled segments having inclined engaging surfaces, means engaging the channels of said segments to bind them together, a device for holding said means, and trunnions connecting said segments and the furcations of said yokes.

6. In a universal joint, a pair of yokes having bearings in the furcations thereof, a body comprising segments having trunnions journaled in said bearings and faces adapted for engaging the inner surfaces of said furcations, said segments and trunnions having passages for carrying a lubricant to said bearings, and means for clamping said segments together.

7. In a universal joint, a body comprising segments containing channels having inclined surfaces, rings having inclined surfaces engaging the inclined surfaces of said channels, and a rivet axially disposed with respect to said segments whereby said rings are clamped on said segments.

8. A universal joint comprising a plurality of segments respectively provided with inclined bearing surfaces, an inclined bearing surface transverse to said surfaces first named, a segmental curved surface transverse to said surfaces first named, and a trunnion disposed between the diverging extensions of said inclined surface first named, and means engaging said inclined surface second named and said curved surface for binding said segments together on said inclined surfaces first named.

9. A universal joint comprising four similar body segments each provided with a trunnion and inclined bearing surfaces symmetrically disposed with reference to said trunnion, and means for connecting said segments and drawing the corresponding bearing surfaces thereof together, in combination with forks connected with said trunnions.

In testimony whereof I have hereunto set my name this 18th day of January, 1916.

ROBT. F. SCOTT.